United States Patent
Feng et al.

(10) Patent No.: US 8,005,007 B2
(45) Date of Patent: Aug. 23, 2011

(54) METHOD, ADJUSTING APPARATUS AND SYSTEM FOR IMPROVING LINE STABILITY

(75) Inventors: Ruzhou Feng, Shenzhen (CN); Jun Zhou, Shenzhen (CN); Xinjun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 12/549,434

(22) Filed: Aug. 28, 2009

(65) Prior Publication Data

US 2009/0316730 A1 Dec. 24, 2009

Related U.S. Application Data

(63) Continuation of application No. PCT/CN2008/071302, filed on Jun. 13, 2008.

(30) Foreign Application Priority Data

Jun. 13, 2007 (CN) .......................... 2007 1 0110765

(51) Int. Cl.
*H04L 12/26* (2006.01)
*H04B 1/38* (2006.01)
(52) U.S. Cl. ........ 370/252; 370/465; 370/493; 370/463; 375/222
(58) Field of Classification Search .................. 370/508, 370/509, 506, 252, 463, 395.64, 251, 493–496, 370/248–249, 465; 375/222
See application file for complete search history.

(56) References Cited

U.S. PATENT DOCUMENTS

| 7,031,346 | B2 * | 4/2006 | Schneider et al. | 370/493 |
| 7,418,240 | B2 * | 8/2008 | Hsu et al. | 455/67.13 |
| 7,519,124 | B2 * | 4/2009 | Oksman et al. | 375/260 |
| 7,643,544 | B2 * | 1/2010 | Okamura et al. | 375/222 |
| 7,796,705 | B2 * | 9/2010 | Tzannes | 375/295 |
| 7,856,033 | B2 * | 12/2010 | Oksman et al. | 370/465 |
| 2005/0180336 | A1 * | 8/2005 | Kim | 370/252 |
| 2005/0237940 | A1 * | 10/2005 | Tennyson | 370/235 |
| 2006/0072722 | A1 * | 4/2006 | Savoor et al. | 379/93.05 |

(Continued)

FOREIGN PATENT DOCUMENTS

CN 1906879 A 1/2007

(Continued)

OTHER PUBLICATIONS

International Search Report from P.R. China in International Application No. PCT/CN2008/071302 mailed Sep. 25, 2008.

(Continued)

*Primary Examiner* — Kwang B Yao
*Assistant Examiner* — Candal Elpenord
(74) *Attorney, Agent, or Firm* — Finnegan, Henderson, Farabow, Garrett & Dunner LLP

(57) ABSTRACT

A method for improving line stability, an adjusting apparatus and a system are provided. The method includes determining an Operating Performance Value (OPV) on a current Digital Subscriber Line (DSL); and if the OPV is below a preset Target Performance Value (TPV), adjusting Management Information Base (MIB) parameters in a line template. The apparatus includes a determining unit and an adjusting unit. With the provided method, apparatus, and system, the error correction capability of the DSL line can be updated with the actual bit error ratio to adapt to a complex environment and to improve the line stability.

14 Claims, 4 Drawing Sheets

U.S. PATENT DOCUMENTS

2008/0112472 A1* 5/2008 Oksman et al. ............... 375/222
2010/0166051 A1* 7/2010 Chung et al. .................. 375/225

FOREIGN PATENT DOCUMENTS

| | | |
|---|---|---|
| CN | 101072048 A | 11/2007 |
| EP | 1953959 A1 | 8/2008 |
| JP | 2006-319706 | 11/2006 |
| KR | 2001-0018011 | 3/2001 |
| WO | WO2006076518 | 7/2006 |

OTHER PUBLICATIONS

Extended European Search Report dated (mailed) Jan. 19, 2010, issued in related Application No. 08757713.6-2416, PCT/CN2008071302, filed Jun. 13, 2008, Hauwei Technologies Co., Ltd.

Written Opinion of the International Searching Authority (translation) dated (mailed) Sep. 25, 2008, issued in related Application No. PCT/CN2008/071302, filed Jun. 13, 2008, Huawei Technologies Co., Ltd.

First Chinese Office Action dated (mailed) Sep. 18, 2009, issued in related Chinese Application No. 200710110765.0 Huawei Technologies C., LTD (3 pages), Partial.

European Patent Office Communication pursuant to Article 94(3) EPC, European search opinion for Application No. 08757713.6, mailed Oct. 21, 2010, Huawei Technologies C., LTD 6 pgs.

"Dynamic Line Management for Digital Subscriber Lines" XP-002442256 Technology White Paper, ALCATEL, Sep. 30, 2005.

"G.Ploam—Reporting of LLPATH, TRELLIS for the ADSLs in an Amendment to G.997.1" Source: ASSIA Inc., ITU—Telecommunication Standardization Sector, Study Group 15, Temporary Document ZC-024, Shenshen, China, Apr. 24-28, 2006.

"G.Ploam—Issues with ACTSNRMODE and SNRMMODE as reported at the CPE MIB," Source: ASSIA Inc., ITU—Telecommunication Standardization Sector, Study Group 15, Temporary Document ZC-XXX, Shenzhen, China, Apr. 24-28, 2006.

* cited by examiner

METHOD, ADJUSTING APPARATUS AND SYSTEM FOR IMPROVING LINE STABILITY

CROSS-REFERENCE TO RELATED APPLICATION

This application is a Continuation of International Application No. PCT/CN2008/071302, filed Jun. 13, 2008, which claims priority to Chinese Patent Application No. 200710110765.0, filed with the Chinese Patent Office on Jun. 13, 2007, and entitled "Method and Apparatus for Adjusting Information Parameters", which is hereby incorporated by reference in its entirety.

TECHNICAL FIELD

The present disclosure relates to communication technologies, and in particular, to a method, adjusting apparatus and system for improving line stability.

BACKGROUND

Digital Subscriber Line (DSL) is a high speed data transmission technology by means of an Unshielded Twisted Pair (UTP). DSL technologies include Asymmetric Digital Subscriber Line (ADSL), Very High Bitrate Digital Subscriber Line (VDSL), ISDN (Integrated Services Digital Network) Digital Subscriber Line (IDSL), Single-pair High-speed Digital Subscriber Line (SHDSL), Asymmetric Digital Subscriber Line 2 (ADSL2), Asymmetric Digital Subscriber Line 2 Plus (ADSL2+), and Very High Bitrate Digital Subscriber Line 2 (VDSL2).

Except IDSL and SHDSL which are based on baseband transmission, all the above DSL technologies (sometimes referred to as xDSL hereinafter) adopt passband transmission with frequency division multiplexing so that DSL and Plain Old Telephone Service (POTS) coexist in one twisted pair, where DSL uses the higher band and POTS uses the baseband portion below 4 kHz. The POTS signal and DSL signal are split or combined by means of a splitter/combiner. xDSL with passband transmission uses Discrete Multi-Tone Modulation (DMT) for modulation and demodulation. A system providing multiple DSL access is a DSL Access Multiplexer (DSLAM). A reference model of the xDSL system is shown in FIG. 1, including a user-side xDSL transceiver (DSLAM) 120 and a network-side xDSL transceiver (DSLAM) 150. The DSLAM 120 includes a user-side transceiver unit 121 and a splitter/combiner 122. On the uplink, the user-side transceiver unit 121 receives and amplifies a DSL signal from a computer 110 and sends the amplified signal to the splitter/combiner 122. The splitter/combiner 122 combines the DSL signal from the user-side transceiver unit 121 and a POTS signal from a phone terminal 130; the combined signal is transmitted along a UTP 140 and received by a splitter/combiner 151 of the network-side DSLAM 150; the splitter/combiner 151 splits the received signal and sends the POTS signal to a Public Switched Telephone Network (PSTN) 160 and sends the xDSL signal to a network-side transceiver unit 152 of the DSLAM 150; the network-side transceiver unit 152 amplifies the received signal and sends the signal to a Network Management System (NMS) 170. On the downlink, the signal is transported in the reverse direction.

In recent years, with the wide application of DSL technologies, especially ADSL1, ADSL2/2+, VDSL and VDSL2, DSL lines are increasing abruptly in networks of operators. Maintaining the DSL lines to assure the quality of service (QoS) operations, diagnosing and analyzing line failures quickly, and optimizing the DSL lines for better line stability become important.

In the existing Dynamic Line Management (DLM), DSL adjustment technologies include adaptively adjusting the proportion of R and N bytes in Forward Error Correction (FEC) code words to improve line stability. The adjusting process is as follows:

In FEC code words, R stands for the number of redundant bytes and N stands for the total number of bytes. The number of correctable bytes in FEC cord words is half the number of redundant bytes, that is, R/2. The current bit error ratio is monitored and calculated in DSL, for example, by calculating the FEC count in the counter and the total number of sent bytes within a certain period of time, for example, in a 15-minute window. The formula is:

$$e = \frac{\text{Error bytes received}}{\text{Total of bytes sent}}.$$

By adjusting the ratio of R and N, it is assured that $$\frac{R}{2N} \geq e$$

and errors on the DSL line can be completely corrected. The stability of the line is therefore improved. In practice, however, it is infeasible for a DLM to improve line stability by adjusting the ratio of R and N, because R and N are not standard Management Information Base (MIB) parameters and not open to third-party applications. Only MIB-defined parameters can be used by third-party applications. Due to the lack of support by the MIB, the error correction capability cannot be updated dynamically with the bit error ratio to adapt to a complex environment. Therefore, the adjustment solution in the prior art cannot diagnose and clear DSL network defects quickly to improve line stability of the network.

SUMMARY

Exemplary embodiments of the present disclosure provide a method for improving line stability, an adjusting apparatus, and a system so as to improve line stability by collecting, analyzing, and adjusting Management Information Base (MIB) parameters of a Digital Subscriber Line (DSL).

A method for improving line stability in an exemplary includes determining an Operating Performance Value (OPV) on a current DSL line; and judging whether the OPV is below a preset Target Performance Value (TPV) and if the OPV is below the preset TPV, adjusting MIB parameters.

Additionally, an adjusting apparatus provided in another exemplary embodiment includes a determining unit configured to determine an OPV on a current DSL line, and an adjusting unit configured to adjust MIB parameters in a line template when the OPV is below a preset TPV.

A communication system provided in another exemplary embodiment includes a Digital Subscriber Line Access Multiplexer (DSLAM) and an adjusting apparatus. The adjusting apparatus is configured to determine an OPV on a current DSL line of the DSLAM and adjust MIB parameters when the OPV on the current DSL line is below a preset TPV.

A computer readable storage medium provided in another exemplary embodiment includes program code which, when executed by a processing unit, causes the processing unit to determine an OPV on a current DSL line; and judge whether the OPV on the current DSL line is below a preset TPV, and if the OPV is below the preset TPV, adjust MIB parameters.

In some exemplary embodiments, the OPV on the current DSL line is determined and compared with the TPV. If the OPV is below the preset TPV, MIB parameters in the line template are adjusted to increase the OPV in the current line template so that the OPV approaches the TPV. Line stability is thereby increased.

DETAILED DESCRIPTION OF THE DISCLOSURE

Exemplary embodiments of the present disclosure are described as follows in detail with reference to the accompanying drawings.

Figure 1:
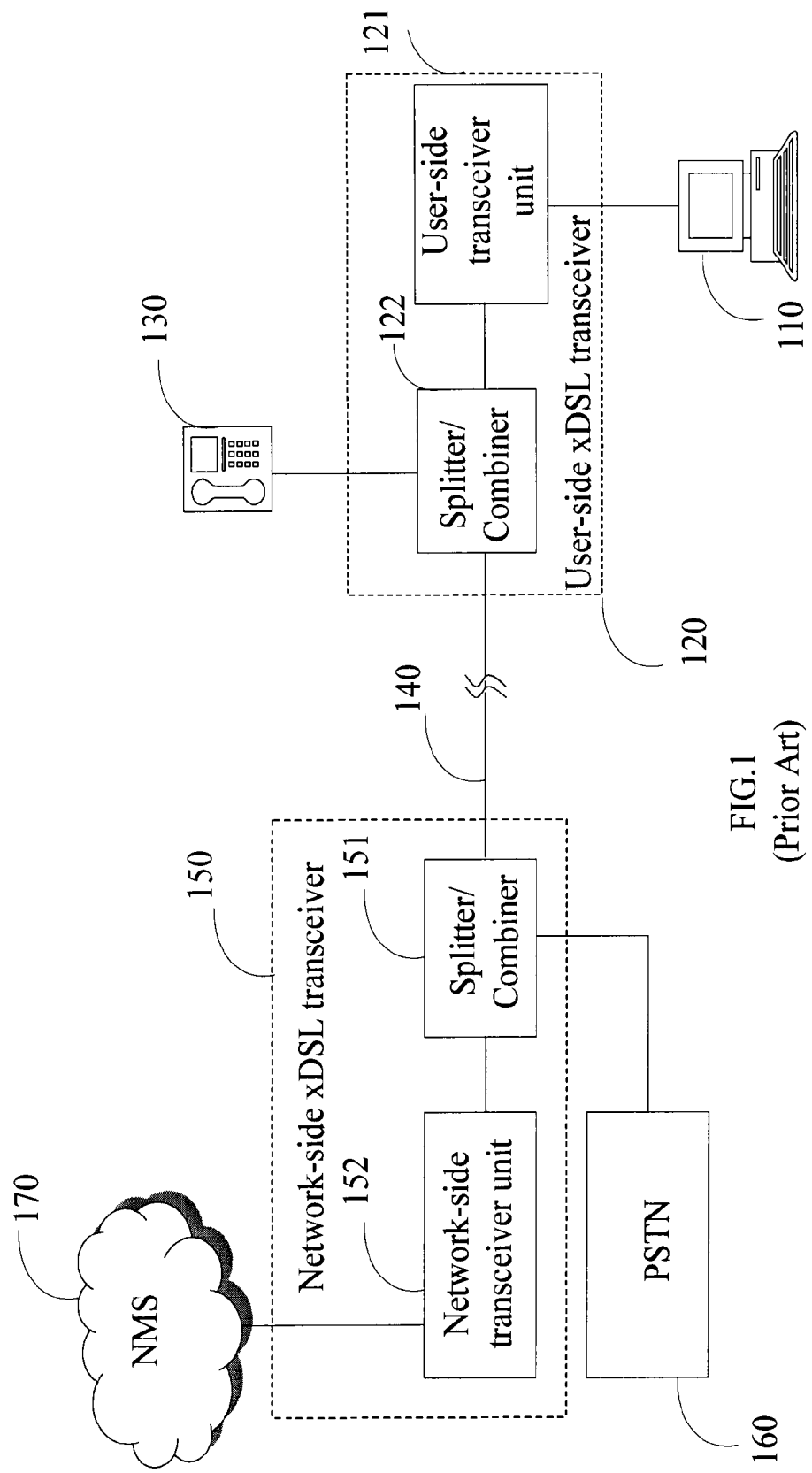
FIG. 1 is a schematic drawing illustrating a reference model of an xDSL system in a prior art.
Figure 2:
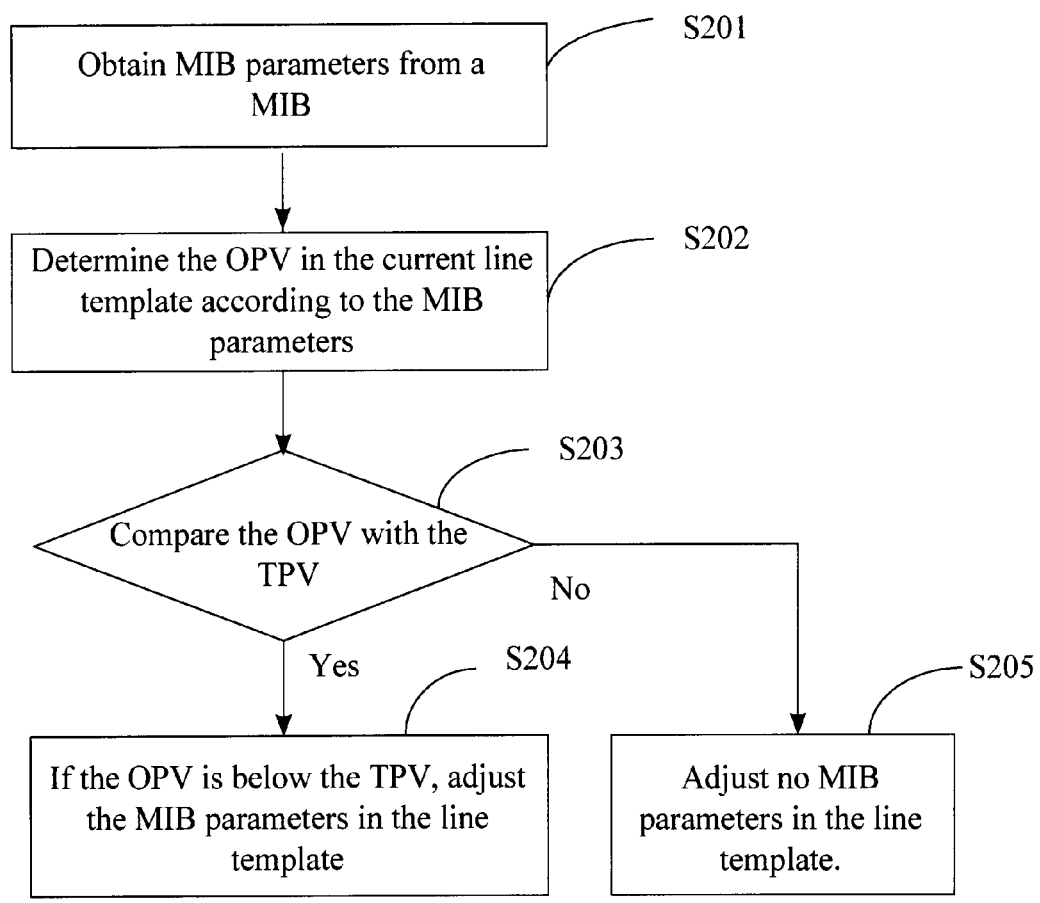
FIG. 2 is a flowchart of a method for adjusting information parameters in an exemplary embodiment of the present disclosure.

FIG. 2 is a flowchart for a method for adjusting information parameters in an exemplary embodiment of the present disclosure. The method includes the following:

S201. MIB parameters are obtained from a Management Information Base (MIB).

S202. The Operating Performance Value (OPV) in the current line template is determined according to the MIB parameters (a line template means all configuration parameters at the physical layer of a DSL line are integrated and maintained in a data set. In a DSL application, a line template may be used directly to configure DSL lines so as to increase the efficiency).

S203. The OPV is compared with the Target Performance Value (TPV). If the OPV is below the TPV, the process proceeds with S204. If not, the process proceeds with S205.

S204. The MIB parameters in the line template are adjusted.

S205. No MIB parameters in the line template are adjusted.

A TPV in S203 may be the product of a preset TPV and an adjustment factor α. In an exemplary embodiment, data collection, data analysis and parameter adjustment of the DLM may all be based on standard MIB parameters. The MIB parameters are standard DSL management information data and general data interfaces. DLM adjustment based on MIB parameters may make DLM algorithms more practical. One example of such a process is as follows:

In S201, MIB parameters are obtained. One method for obtaining MIB parameters is to collect MIB parameters dynamically and periodically from the DSL line and then store the MIB parameters to create a history database. The dynamic and periodical MIB parameter collection process is as follows:

After the DSL line is active in "showtime" mode ("showtime" mode indicating that the modem is online and running as expected), the Network Management System (NMS) usually collects MIB parameters at intervals of 15 minutes and stores the parameters in the MIB of the NMS. Alternatively, the MIB parameters may be collected at any interval, such as a regular period or real time, or various combinations of means. The standard documents defining MIB parameters of DSL are:

ADSL-LINE-MIB:rfc2662,
ADSL-LINE-EXT-MIB:rfc3440,
ADSL-TC-MIB:rfc2662,
HDSL2-SHDSL-LINE-MIB:rfc3276,
VDSL-LINE-MIB:rfc3728.

With respect to ADSL, there are many MIB parameters, including but not limited to Cyclic Redundancy Check (CRC) codes, configuration parameters of a line template and error correction capability parameters. The MIB parameters are well known to those skilled in the art and therefore omitted herein.

In S202, the OPV in the current line template is determined according to the MIB parameters. Specifically, the bit error ratio in the measurement period is set to the TPV and then the bit error ratio in the period is calculated according to the error value counted by the CRC code counter periodically. The obtained bit error ratio in the period may be the OPV, the noise tolerance, or any other parameter. One exemplary process is as follows:

The appropriate OPV is calculated according to the collected MIB parameters. The TPV may be determined by the vendor or operator according to specific needs.

The following descriptions are based on ADSL1 and ADSL2/2+ respectively.

In the case of ADSL1, the operator may require that the TPV be defined as the bit error ratio within 15 minutes (or any other time) not exceeding $10e^{-7}$ after ADSL1 is active and that OPV be the current bit error ratio within the 15 minutes. The OPV calculation process is as follows:

A CRC Code Violation (CRC CV) measured by the CRC code counter within 15 minutes can be obtained from the MIB parameters collected in S201. 68 Dispersion Multitone (DMT) data frames are transmitted within 17 ms, which means frames are transmitted at intervals of 0.25 ms. Then, one super frame of ADSL includes 68 data frames and shares one CRC code. The CRC CV is measured once in the period. Therefore, the formula for calculating the OPV bit error ratio is:

$$e = \frac{CV \times 0.017}{15 \times 60}$$

where e is a bit error ratio and CV is the CV measured by the CRC code counter within 15 minutes.

In the case of ADSL2/2+, the operator may require that TPV be defined as the bit error ratio within 15 minutes not exceeding $10e^{-7}$ after ADSL2/2+ is active and that the OPV be the current bit error ratio within the 15 minutes. The OPV calculation process is as follows:

A CRC CV within the 15 minutes is obtained from the MIB parameters. In the case of ADSL2/2+, the check range of CRC is $(T_p \times SEQ_p \times K_p - 1) \times 8$ bits. Then, the formula for calculating the OPV bit error ratio is:

$$e = \frac{CV \times (T_p \times SEQ_p \times K_p - 1) \times 8}{L_p \times 4000 \times 15 \times 60}$$

where e is a bit error ratio; CV is the CV value measured by the CRC code counter within the 15 minutes; $T_p$ is the ratio of multiplex data frames of a delay path #p to its synchronization bytes; $SEQ_p$ is the length of synchronization bytes of the delay path #p; $K_p$ is the number of bytes of one multiplex data frame of the delay path #p; $L_p$ is the number of bits of one data frame of the delay path #p.

From S203 to S205, the OPV is compared with the TPV. The TPV in an exemplary embodiment may be the product of a preset TPV and an adjustment factor α. Specifically, after the current OPV of the DSL line is obtained, the OPV is compared with the TPV. If the OPV is greater than or equal to the TPV, the MIB parameters of the DSL line are not adjusted; if the OPV is less than the TPV, the MIB parameters of the DSL line are adjusted and trained again. The configurations of MIB parameters in the line template are adjusted according to the OPV and the TPV and the adjusted parameters are sent to the transceiver of the DSL line. The transceiver adjusts the physical layer error correction capability parameters according to the configuration parameters. This process is repeated and the purpose of improving line stability is achieved. The specific implementation is as follows:

The OPV is compared with the TPV, for example OPV≧TPV×α, where α is the adjustment factor, which may be any non-negative number. Generally, α is equal to 1. It may also be a decimal fraction. For example, the bit error ratio (TPV) required by the Internet is $10e^{-7}$ and that required by IPTV is $10e^{-9}$. Then, to meet the requirement of IPTV, the adjustment factor is 0.01, so the bit error ratio is better monitored.

If the OPV is below the TPV, it is necessary to adjust MIB parameters in the line template. Still, ADSL1 and ADSL2/2+ are taken as examples respectively.

In the case of ADSL1, if the bit error ratio on the DSL line within 15 minutes is greater than or equal to $10e^{-7}$ (where α=1), and the current Signal to Noise Ratio Margin (SNR Margin) does not change, it can be determined that the CRC code violation is induced by a burst impulse noise on the DSL line. The reason for judging progressive change of the impulse noise is progressive change of the SNR margin, making it necessary to adjust the following MIB parameter in the line template.

The interleaved delay is doubled without changing other MIB parameters in the line template. The adjustment may be repeated until the bit error ratio on the line meets the requirement. Specifically, the step of each adjustment is double the interleaved delay until the bit error ratio meets the requirement (the TPV). The specific adjustment formula is:

{MaxInterleavedDelay'=MaxInterleavedDelay×2

Other MIB parameters in the template are not changed}

MaxInterleavedDelay' is the adjusted interleaved delay; MaxInterleavedDelay is the unadjusted interleaved delay.

After the adjustment is complete, the adjusted configuration parameter is sent to the DSL transceiver. The transceiver of the line adjusts the physical layer error correction capability parameters according to the configuration parameter and retrains and activates a new line template, where retraining means re-initializing, so that the new line template is activated. In this embodiment, by adjusting MIB parameters in the line template, the interleaved delay can be increased to the effect that the error correction capability on the DSL line is doubled. The error correction capability may be increased step by step and the adjustment goes on cyclically until the bit error ratio on the line meets the requirement.

In the case of ADSL2/2+:

If the bit error ratio on the DSL line within 15 minutes is greater than or equal to $10e^{-7}$ (where α=1) and the SNR Margin does not change, it can be determined that the CRC is induced by a burst impulse noise on the line. In this case, the following adjustment can be made to the MIB parameters in the line template:

Impulse Noise Protection (INP) is doubled without changing other MIB parameters in the line template. The adjustment may be repeated until the bit error ratio on the line meets the requirement. Specifically, the step of each adjustment is double the INP parameter until the bit error ratio meets the requirement (TPV). The specific adjustment formula is:

{MinINP'=MinINP×2

Other MIB parameters in the template are not changed}

Where, MinINP' is the adjusted minimum INP; MinINP is the unadjusted interleaved delay.

After the adjustment is complete, the adjusted parameter is sent to the DSL transceiver and the transceiver of the line retrains and activates a new template. The INP is increased to the effect that the error correction capability on the DSL line is doubled. The error correction capability may be increased step by step and the adjustment may be repeated until the bit error ratio requirement on the line is met. The purpose of line stability is also achieved.

Figure 3:
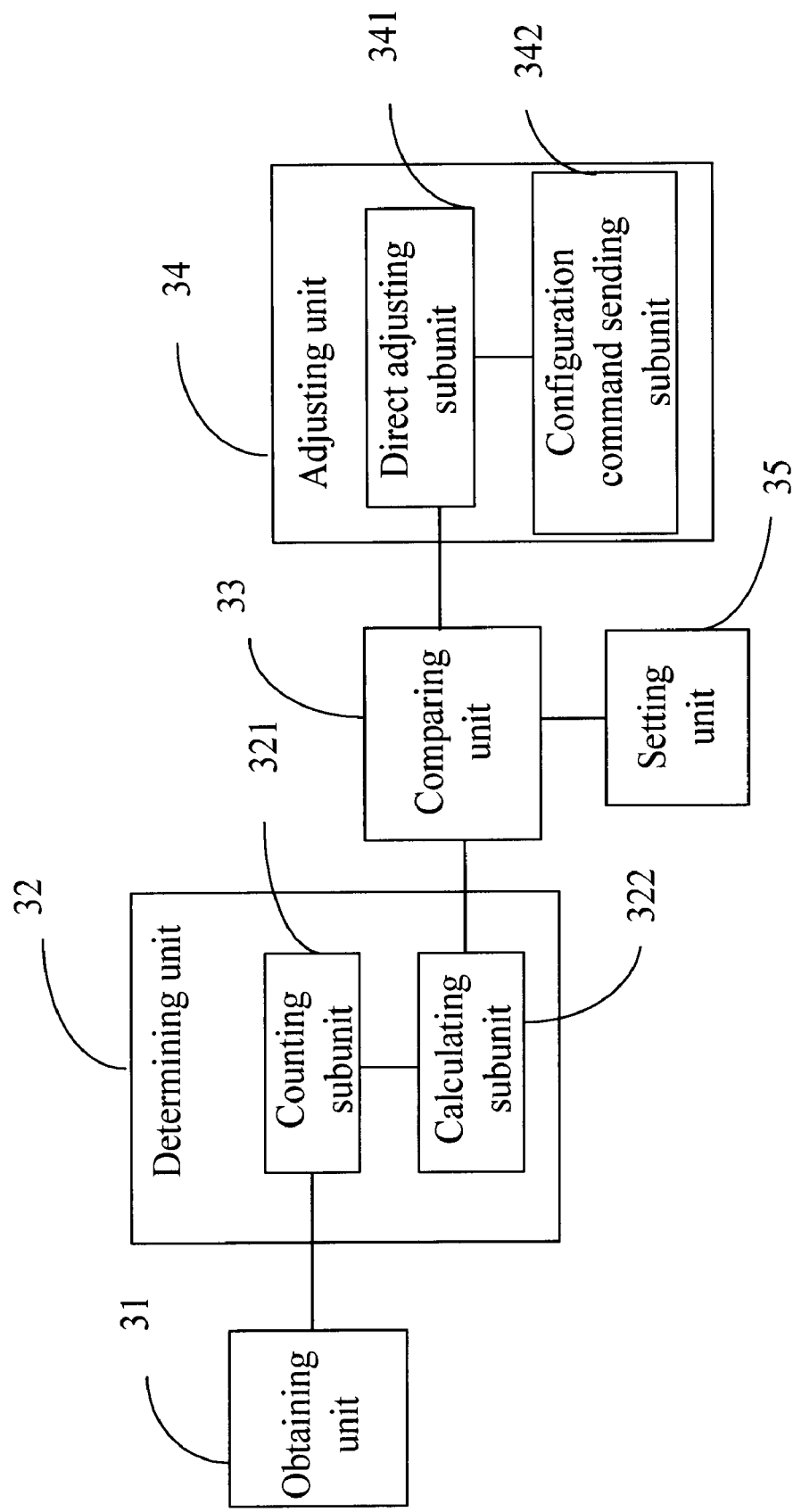
FIG. 3 is a schematic drawing illustrating a structure of an apparatus for adjusting information parameters in another exemplary embodiment of the present disclosure.

An adjusting apparatus is provided according to another embodiment of the present disclosure. A structure of an exemplary apparatus is shown in FIG. 3, and the apparatus includes an obtaining unit 31 (optional), a determining unit 32, a comparing unit 33, and an adjusting unit 34. The obtaining unit 31 is configured to obtain MIB parameters from an MIB, where the MIB parameters include CRC codes, configuration parameters in a line template, and error correction capability parameters; or is configured to collect MIB parameters after a DSL line is active in Showtime mode. The collection may be at regular intervals or in real time, or various combinations of the two means. For example, the obtaining unit 31 may collect MIB parameters once every 15 minutes.

The determining unit 32 is configured to determine the OPV on the current DSL line according to the MIB parameters. The determining unit 32 includes a counting subunit 321 and a calculating subunit 322. The counting subunit 321 is configured to obtain a code violation measured by a CRC code counter within a given time from the MIB parameters, and the calculating subunit 322 is configured to calculate the bit error ratio in the unit time according to the code violation measured by the CRC code counter as the OPV on the current DSL. The adjusting apparatus further includes a setting unit 35 configured to set a bit error ratio in the given time to a TPV and send the TPV to the comparing unit 33. Taking ADSL1 as an example, the implementation process is as follows:

The operator starts the setting subunit 35 after ADSL1 is active to set a TPV indicating that the bit error ratio within 15 minutes (or any other time) should not exceed $10e^{-7}$, and to set the OPV to the current bit error ratio within the 15 minutes. This means the OPV may be obtained by using a calculation formula, which is described above without being limited to the above. Other calculation formulas may also be used and are within the scope of the disclosure.

The comparing unit 33 is configured to compare whether the OPV is below the product of the preset TPV and an adjustment factor (referred to as TPV hereinafter) and to return the comparison result to the adjusting unit 34. The adjusting unit 34 is configured to adjust MIB parameters of the line template when the OPV is below the TPV. The adjusting unit 34 includes a direct adjusting subunit 341 and a configuration command sending subunit 342. The direct adjusting subunit 341 is configured to adjust the configuration parameters of the MIB parameters in the line template directly according to the OPV and the configuration command sending subunit 342 is configured to send the adjusted configuration parameters to a corresponding line transceiver via a command path.

Taking ADSL1 as an example, the implementation process includes as follows:

If the bit error ratio on the DSL line within 15 minutes is greater than or equal to $10e^{-7}$ (where a=1) and the SNR Margin does not change, it can be determined that the CRC is induced by a burst impulse noise on the line. In this case, the following adjustment may be made to MIB parameters in the line template: double the interleaved delay without changing other MIB parameters until the bit error ratio on the line meets the requirement. The specific adjustment formula is:

{MaxInterleavedDelay'=MaxInterleavedDelay×2

Other MIB parameters in the template are not changed}

The new template is retrained and activated. In the foregoing process, the interleaved delay is increased to the effect that the error correction capability on the DSL line is doubled. The error correction capability may be increased step by step and the adjustment is repeated until the bit error ratio on the line meets the requirement and thereby the purpose of line stability is achieved.

The OPV and the TPV in an exemplary embodiment may be an MIB parameter or any sub-parameter defined by an MIB parameter, such as SNR Margin, Output Power, Errored Second (ES), Severely Errored Second (SES), Loss of Frame (LOF), Loss of Link (LOL), Loss of Power Supply (LPR) and Loss of Signal (LOS).

Figure 4:
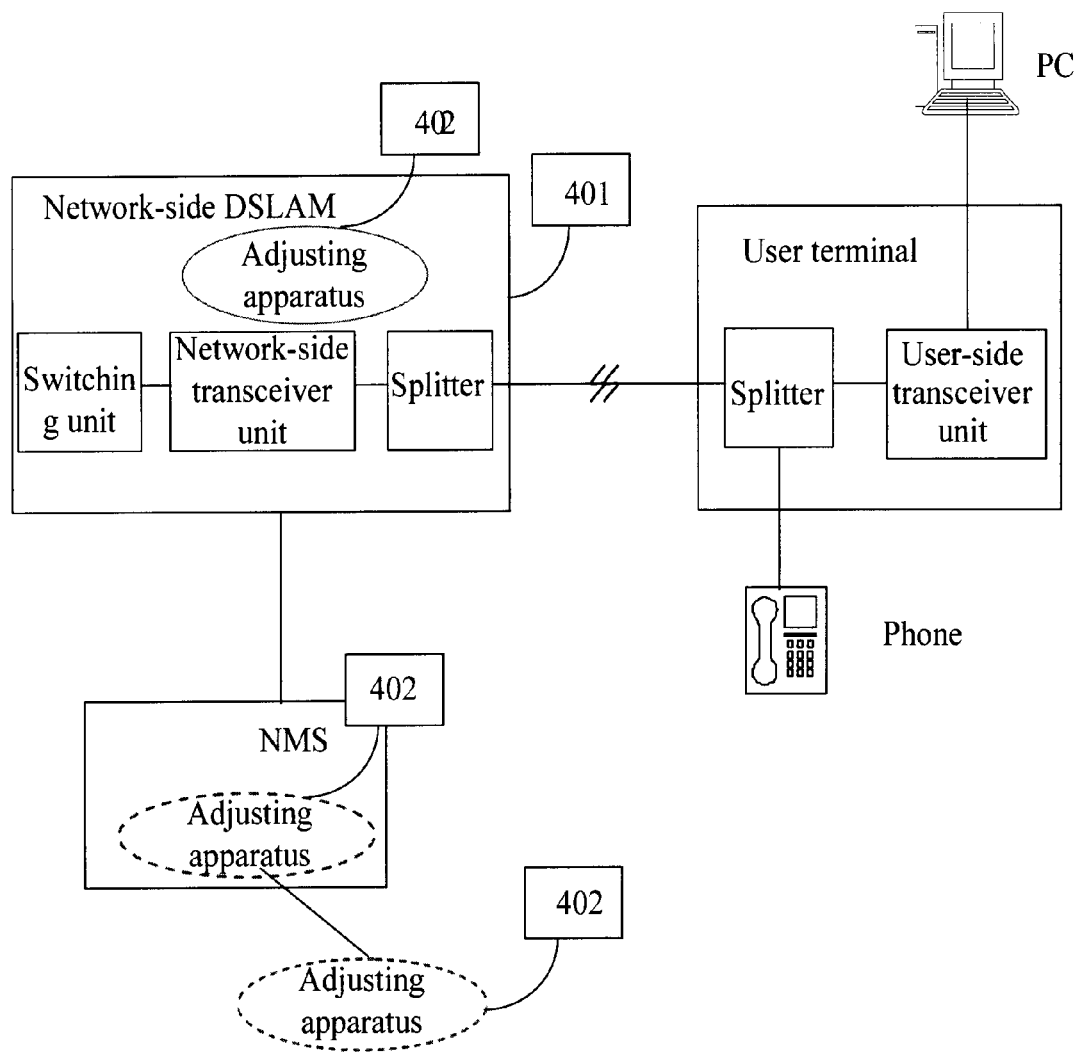
FIG. 4 is a schematic drawing illustrating a communication system in yet another exemplary embodiment of the present disclosure.

As shown in FIG. 4, a communication system according to an exemplary embodiment of the present disclosure includes a DSLAM 401 and an adjusting apparatus 402. The system also includes user terminals, phones and Personal Computers (PCs).

The DSLAM 401 includes a switching unit, a network-side transceiver unit, and a splitter. The user terminal includes a splitter and a user-side transceiver unit, the functions of which are already familiar to those skilled in the art and therefore are omitted herein.

The adjusting apparatus 402 is configured to determine the OPV on the current DSL line of the DSLAM and to adjust MIB parameters when the OPV on the current DSL line is below a preset TPV. This means the adjusting apparatus implements the function in the above embodiment of the adjusting method. The function of the adjusting apparatus may also be implemented via software or a software system.

The adjusting apparatus 402 may be integrated in a Network Management System (NMS) or stand alone in the network (as shown in the dashed lines in FIG. 4) to manage the DSLAM via a MIB interface. Optionally, the adjusting apparatus 402 may be integrated in the DSLAM 401 (as shown in the continuous line in FIG. 4) to manage the DSLAM. The adjusting apparatus 402 may also be implemented in an upper level management system of the NMS, such as an Operations Support System (OSS). Appropriate technologies in the prior art are adopted for information exchange between the adjusting apparatus and the DSLAM, such as the protocol type and message format according to the applicable environment. FIG. 4 shows three possible positions of the adjusting apparatus but it should not be understood that three such adjusting apparatuses coexist in the system.

An exemplary communication system of the present disclosure may be understood as a combination of a DSLAM and the following computer readable storage medium to manage the DSLAM.

The computer readable storage medium according to an embodiment of the present disclosure includes computer program codes which, when executed by a computer unit/processor, will cause the computer unit to implement the following process:

determining the OPV on the current DSL line; and judging whether the OPV on the current DSL line is below a preset TPV, and if the OPV on the current DSL line is below the preset TPV, adjusting MIB parameters.

The embodiments of the present disclosure are described by taking ADSL1 and ADSL2/2+ as an example, but are not limited to ADSL1 and ADSL2/2+. The embodiments of the present disclosure are also applicable to other DSL technologies such as SHDSL, VDSL1, and VDSL2. The specific implementation can be understood by those skilled in the art when provided with the exemplary cases of ADSL1 and ADSL2/2+.

In exemplary embodiments of the present disclosure, the OPV on the current DSL line is determined and compared with the TPV; if the OPV is below the preset TPV, MIB parameters in the line template are adjusted to increase the OPV in the current line template so that the OPV is equal or closer to the TPV. The purpose of increasing line stability is thus achieved. The adjustment in an exemplary embodiment may be automated so as to not require human. Furthermore, because MIB parameters are standard parameters, the error correction capability of the current line is updated dynamically with the actual bit error ratio. The configuration template is automatically changed to effectively reduce the bit error ratio of the line, to enhance user satisfaction, and to reduce the cost of maintenance for better adaptation to a complex environment. The purpose of increasing line stability is thus achieved.

In exemplary embodiments, collection and analysis of data (such as MIB parameters) and parameter adjustment in the DLM are processed via standard MIB interfaces. For the operator and vendor, MIB parameters are configurable. Therefore, an embodiment of the present disclosure provides a practical DLM solution for adjustment in the prior art. In particular, data collection, data analysis and parameter adjustment are automatic (by an NMS, a host, a board or other means). Furthermore, because MIB parameters are standard parameters, the error correction capability of the current line is updated with the actual bit error ratio for better adaptation to a complex environment. The purpose of increasing line stability is thus achieved. In other words, exemplary embodiments of the present disclosure enable quick diagnosis, analysis, and troubleshooting of the DSL network so as to increase the speed of services over the network (for example, from 512 kbps or 1 Mbps to 2 Mbps or higher), to introduce new services that require higher bandwidth and better line quality (for example, IPTV) and to provide references for determining the network and line quality. Also, the embodiments can automatically and continuously monitor the quality of network services at the physical layer before number allocation or during service provisioning so as to improve the quality of service for end users, to enhance the satisfaction and loyalty of users, and to reduce Operating Expenditure (OPEX).

Although the present disclosure has been described through exemplary embodiments, the disclosure is not limited to such embodiments. It is apparent that those skilled in the art can make various modifications and variations to the disclosure without departing from the scope of the disclosure.

The disclosure is intended to cover the modifications and variations that fall within the scope of protection defined by the following claims or their equivalents.

What is claimed is:

1. A method for improving line stability, comprising: determining by a processor an Operating Performance Value (OPV) on a current Digital Subscriber Line (DSL); and judging by the processor whether the OPV is larger than or equal to a preset Target Performance Value (TPV) and if the OPV is larger than or equal to larger-the preset TPV, adjusting by the processor Management Information Base (MIB) parameters by increasing an interleaved delay of a line template of a line to double without changing other configuration parameters in the line template until a bit error ratio on the line meets requirements.

2. The method of claim 1, further comprising:
obtaining the MIB parameters from an MIB, wherein the MIB parameters comprise Cyclic Redundancy Check (CRC) codes, the configuration parameters in a line template, and error correction capability parameters.

3. The method of claim 1, wherein the process of determining the OPV on the current DSL line comprises:
calculating the bit error ratio within a given time as the OPV on the current DSL line.

4. The method of claim 3, wherein with respect to Asymmetrical Digital Subscriber Line 1 (ADSL1), the process of determining the OPV on the current DSL comprises:
obtaining a Code Violation (CV) value measured by a Cyclic Redundancy Check (CRC) code counter within N minutes from the MIB parameters; and
determining the bit error ratio within the given time according to the CV value measured by the CRC code counter and $$e = \frac{CV \times 0.017}{N \times 60}$$

as the OPV on the current DSL line, wherein e stands for the bit error ratio.

5. The method of claim 1, wherein judging whether the OPV is larger than or equal to the preset TPV comprises:
judging whether the OPV is larger than or equal to a product of the present TPV and an adjustment factor.

6. The method of claim 1, wherein the process of adjusting the MIB parameters comprises:
adjusting the configuration parameters in the MIB parameters in the line template according to the OPV and the TPV and sending the adjusted configuration parameters to a DSL transceiver; and
adjusting, by the transceiver, error correction capability parameters at a physical layer according to the configuration parameters.

7. A method for improving line stability of an Asymmetrical Digital Subscriber Line 2 or Asymmetrical Digital Subscriber Line 2 plus (ADSL2/2+), comprising: by a processor determining an Operating Performance Value (OPV) on a current Digital Subscriber Line (DSL); and judging by the processor whether the OPV is larger than or equal to a product of a preset Target Performance Value (TPV) and an adjustment factor; and if the OPV is larger than or equal to the product of the preset TPV and the adjustment factor, adjusting by the processor Management Information Base (MIB) parameters by increasing Impulse Noise Protect (INP) of a line template of a line to double without changing other configuration parameters in the line template until rhea bit error ratio on the line meets requirements.

8. The method of claim 7, wherein determining of the OPV on the current DSL line comprises:
obtaining a Code Violation (CV) value measured by a Cyclic Redundancy Check (CRC) code counter within N minutes from the MIB parameters; and
determining the bit error ratio within a given time according to the CV value measured by the CRC code counter and $$e = \frac{CV \times (T_p \times SEQ_p \times K_p - 1) \times 8}{L_p \times 4000 \times N \times 60}$$

as the OPV on the current DSL line,
wherein e is the bit error ratio;
$T_p$ is a ratio of multiplex data frames of a delay path p to its synchronization bytes;
$SEQ_p$ is a length of the synchronization bytes of the delay path p;
$K_p$ is a number of bytes of one multiplex data frame of the delay path p; and
$L_p$ is a number of bits of one data frame of the delay path p.

9. A non-transitory computer-readable medium including program code, which when executed by a processor, causes the processor to: to determine an Operating Performance Value (OPV) on a current Digital Subscriber Line (DSL); compare whether the OPV is larger than or equal to a product of a preset Target Performance Value (TPV) and an adjustment factor; and if the OPV is larger than or equal to the product, increase Impulse Noise Protect (INP) of a line template of a line to double without changing other configuration parameters in the line template until a bit error ratio on the line meets requirements.

10. The non-transitory computer-readable medium of claim 9, wherein the program code further causes the processor to obtain the MIB parameters from an MIB, wherein the MIB parameters comprise Cyclic Redundancy Check (CRC) codes, the configuration parameters in the line template, and error correction capability parameters.

11. The non-transitory computer-readable medium of claim 9, wherein the program code further causes the processor to: obtain a Code Violation (CV) value measured by a Cyclic Redundancy Check (CRC) code counter within a given time from the MIB parameters; and calculate the bit error ratio within a given time according to the CV value measured by the CRC code counter as the OPV on the current DSL line.

12. The non-transitory computer-readable medium of claim 9, wherein the program code further causes the processor to compare whether the OPV is larger than or equal to product of the preset TPV and an adjustment factor, and if the OPV is larger than or equal to the product, send a comparison result to an adjusting unit.

13. The non-transitory computer-readable medium of claim 9, wherein the program code further causes the processor to set the bit error ratio in a given time as the preset TPV and send the preset TPV to a comparing unit.

14. The non-transitory computer-readable medium of claim 9, wherein the program code further causes the processor to: adjust the configuration parameters in the MIB parameters of the line template according to the OPV and the TPV; and send the adjusted configuration parameters to a DSL transceiver via a command path.

* * * * *